United States Patent [19]

Love

[11] Patent Number: 5,587,067
[45] Date of Patent: Dec. 24, 1996

[54] WASTEWATER TREATMENT APPARATUS

[75] Inventor: Leonard S. Love, Mississauga, Canada

[73] Assignee: Sydlo Inc., Mississauga, Canada

[21] Appl. No.: 493,074

[22] Filed: Jun. 21, 1995

[51] Int. Cl.$^6$ ...................................................... C02F 9/00
[52] U.S. Cl. .......................... 210/155; 210/162; 210/202; 210/255; 210/312
[58] Field of Search .................................. 210/154, 155, 210/162, 202, 220, 221.1, 221.2, 255, 259, 299, 312, 433.1, 483, 495, 335, 336, 525, 538, 540

[56] References Cited

U.S. PATENT DOCUMENTS

| | | | |
|---|---|---|---|
| 1,239,388 | 9/1917 | Hamner | 210/495 |
| 1,254,125 | 1/1918 | Dash | 210/433.1 |
| 1,861,031 | 5/1932 | Schmitt | 210/162 |
| 1,972,264 | 9/1934 | Hirschhorn | 210/495 |
| 3,015,621 | 1/1962 | Quast | 210/525 |
| 3,047,492 | 7/1962 | Gambrel | 210/259 |
| 3,297,567 | 1/1967 | Tapleshay | 210/220 |
| 3,451,555 | 6/1969 | Ginaven | 210/433.1 |
| 3,674,687 | 7/1972 | Quase | 210/259 |
| 3,710,941 | 1/1973 | Brociner | 210/220 |
| 5,015,393 | 5/1991 | Russell et al. | 210/525 |
| 5,406,966 | 4/1995 | Lepkowski et al. | 210/162 |

FOREIGN PATENT DOCUMENTS 44143  8/1888  Germany.

*Primary Examiner*—Christopher Upton
*Attorney, Agent, or Firm*—Bereskin & Parr

[57] ABSTRACT

Headworks for preliminary treatment of wastewater in a sewage treatment plant provides for primary filtration of grit and other coarse debris, de-ragging in a flume which carries the water away from the filter, chemical addition in a chemical mixing tank and scum removal in a scum removal tank provided with a scum skimmer. The scum removal tank may also be provided with means for pre-aerating the wastewater, secondary grit removal means, secondary de-ragging means and a partial flume for flow measurement. A debris collection device in the form of a flexible fabric sock is also disclosed.

14 Claims, 6 Drawing Sheets

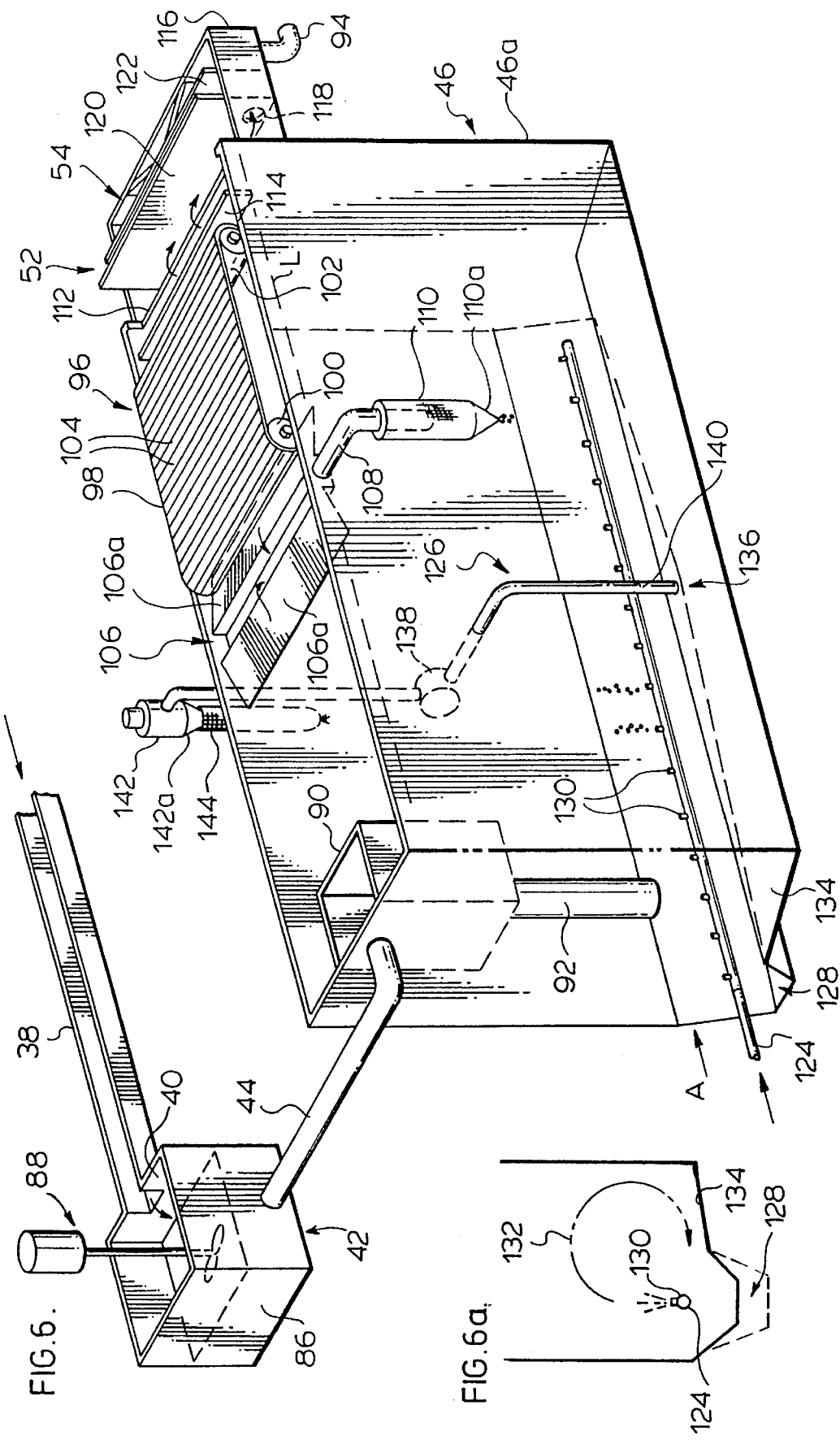

WASTEWATER TREATMENT APPARATUS

FIELD OF THE INVENTION

This invention relates generally to municipal and industrial wastewater treatment apparatus, and is concerned more particularly with pre-treatment or so-called "headworks" apparatus used to treat raw wastewater (sewage) as a preliminary to biological treatment for removal of organic material.

BACKGROUND OF THE INVENTION

When typical raw wastewater arrives at the treatment plant it may be septic (odorous) and contain dissolved gases, greases, oils, rags, plastics of all sorts, grit, rocks, wood particles and a variety of other undesirable materials. Therefore pre-conditioning, or pre-treatment, is essential. Traditionally, preconditioning is accomplished by individual screening and grit removal devices, arranged in series. Scum is removed at primary or secondary clarifiers where it is collected and added to biological sludge from the main treatment process, and is a constant source of day-to-day operating problems. This technology also fails to prevent rags, and other fibrous material from finding their way into the main treatment units where they clog pumps and cause other problems. Normally these individual units are placed close to the plant inlet, where, in anticipation of future plant expansion, they occupy a large area. Also it is often necessary to house some units, depending on the climatic conditions and the particular equipment that has been selected.

This approach is costly in terms of initial plant design and construction costs, and also in terms of on-going operating costs. Operation of a plant of this type is fairly labor-intensive in that the individual units often require personal supervision to ensure proper operation. It is very difficult to automate or even partially automate a sewage treatment plant designed on these principles.

Flow rate measurement normally is performed at a fairly early stage in the treatment process in order to provide a means of monitoring the rate of sewage flow through the plant in comparison with the design capacity of the plant. Typically, flow rate is measured immediately after the fine screening, by passing the wastewater through a parshall flume having a restricted cross-section which causes the liquid level to elevate. By measuring the liquid level within the restricted cross-section, it is possible to measure the flow rate. The difficulty is that, at this stage in the process, the wastewater still contains scum and other debris, as well as bacteria that may tend to cause the flume become odorous.

SUMMARY OF THE INVENTION

An object of the present invention is to provide preliminary treatment apparatus for wastewater which is designed to address the problems of the prior art.

In one aspect, the invention provides a unitary wastewater treatment apparatus having an inlet for raw wastewater and a treated effluent outlet, and including a screen for receiving raw wastewater from said inlet, the screen being designed to remove coarse particles from the wastewater and having an outlet. The apparatus also includes a flume having an inlet coupled to the fine screen outlet and a discharge. De-ragging means is provided in the flume. The apparatus also includes scum and grit removal means comprising a tank for receiving wastewater from the flume and adapted to contain a body of water to a defined level. The tank has an effluent outlet communicating with the treated effluent outlet of the apparatus and a skimmer is provided for removing scum from the surface of the body of the water in the tank. Pre-aeration means and grit removal means are also provided in the tank. A chemical mixing tank is located between the flume discharge and the effluent outlet from the apparatus to permit chemical addition to the wastewater being treated.

For convenience, the term "headworks" will hereafter be used to refer generally to preliminary treatment apparatus of the form provided by the invention. Also, it should be noted that the term "de-ragging" is intended to cover removal not only of rags as such, but also other debris, fibrous or not, including plastic sheets, condoms and other items that might otherwise cause clogging, e.g. of pumps in the treatment system.

A primary advantage of the headworks of the invention is that it combines in one installation, a large number of functions that traditionally have had to be provided by individual, custom-designed treatment units. In its broadest aspect, the headworks combines the functions of removal of grit and other debris, de-ragging, scum removal, pre-aeration and chemical addition. In a particular embodiment that will be described in more detail later, nine separate functions are in fact combined in a single headworks installation, namely fine screening, de-ragging, grit removal, scum removal, secondary de-ragging, flow measurement, solids collection and disposal, pre-aeration and chemical addition. Wastewater that has been treated in this way is a fairly clear solution which primarily contains soluble organic matter (to be removed in subsequent treatment steps).

Pre-aeration of the wastewater can be performed in the scum removal tank by providing air diffusers in a lower region of the tank. It has been found that pre-aeration can be performed in this way without impairing the scum removal function. Scum rises naturally to the surface of the body of liquid where it is removed by the scum skimmer. The air diffusers can be arranged to cause controlled flow at a low level in the body of water to encourage any grit that may remain to settle out.

Secondary de-ragging and flow measurement may be performed at the downstream end of the scum removal tank.

Grit and other debris can be removed from the apparatus at various points in the overall treatment process. While conventional grit removal devices such as inclined screens can be used, according to another aspect of the invention, a novel form of debris collection device is provided. It is to be understood that a device of this form can be used not only in a wastewater treatment apparatus of the form provided by the present invention but also in other forms of wastewater treatment apparatus in which debris removal is required. There is no limitation to use of this device in headworks.

According to this aspect of the invention, the debris collection device comprises a tubular receptacle intended to be suspended from a support in a generally upright orientation. The receptacle has a closed lower end and an open upper end into which wet debris can be delivered. The receptacle has a porosity selected to allow water to pass through while retaining the debris within the receptacle. The receptacle is capable of removal from the support for disposal of the debris contained therein.

In a specific aspect, the receptacle is a bag or sock, for example of woven fabric having an appropriate mesh size selected to allow water to pass through while retaining the particular debris that is to be collected. For convenience, the term "sock" will be used in the following description to refer to the receptacle. Alternatively the sock may be a rigid receptacle constructed of metal or plastic or some other such material.

The support from which the sock is suspended can be a short collar or tube arranged with its axis vertical. The upper end or mouth of the sock is then simply drawn around the collar or tube and tied or otherwise clamped in place. When the sock is full, it can be removed from the support and either emptied or discarded as a whole.

The inlet to the sock can be through a second, similar type of enclosure, or sock, of a smaller diameter, or cross-section, and which contains larger perforations such that larger particles will be removed prior to the liquid entering the sock proper. It will be possible to remove this enclosure, for cleaning, without disturbing the contents of the sock proper.

A debris collection device of the form provided by the invention represents a marked improvement as compared with prior art devices such as inclined screen filters, in which the debris simply slides off the inclined screen (while the water passes through the screen) and accumulates as a sludge. Odor problems often develop from such sludges and in any event the sludge represents a disposal problem in itself. In contrast, the disposal sock provided by the invention confines the debris in an receptacle which is easily manageable and disposable as a unit. If an odor problem should develop, it is a simple matter to remove the sock and dispose of the debris. However, odor problems are likely to be less prevalent because the debris can dry out while it hangs suspended in the sock.

While the material discharged from the fine screen and the grit from the grit separator are de-watered in a sock, the scum that is skimmed off of the top of the scum removal tank is directed to a scum concentrator, from which it may be treated and disposed of separately. Conventionally, the scum is added to other sludges for final disposal. This procedure is most unsatisfactory because scum is not compatible with conventional sludge digestion processes; the scum therefore is a source of on-going day-to-day operating problems.

BRIEF DESCRIPTION OF DRAWINGS

In order that the invention may be more clearly understood, reference will now be made to the accompanying drawings which illustrate a particularly preferred embodiment of the invention by way of example, and in which:

FIG. 4a is a partial schematic plan view of a de-ragger shown in FIG. 4;

FIG. 6 is a perspective view showing the chemical mixing tank and the scum and grit removal tank of the apparatus, again in "exploded" positions; and, FIG. 6a is a schematic partial vertical sectional view in the direction of arrow A in FIG. 6.

DESCRIPTION OF PREFERRED EMBODIMENT

Figure 2:
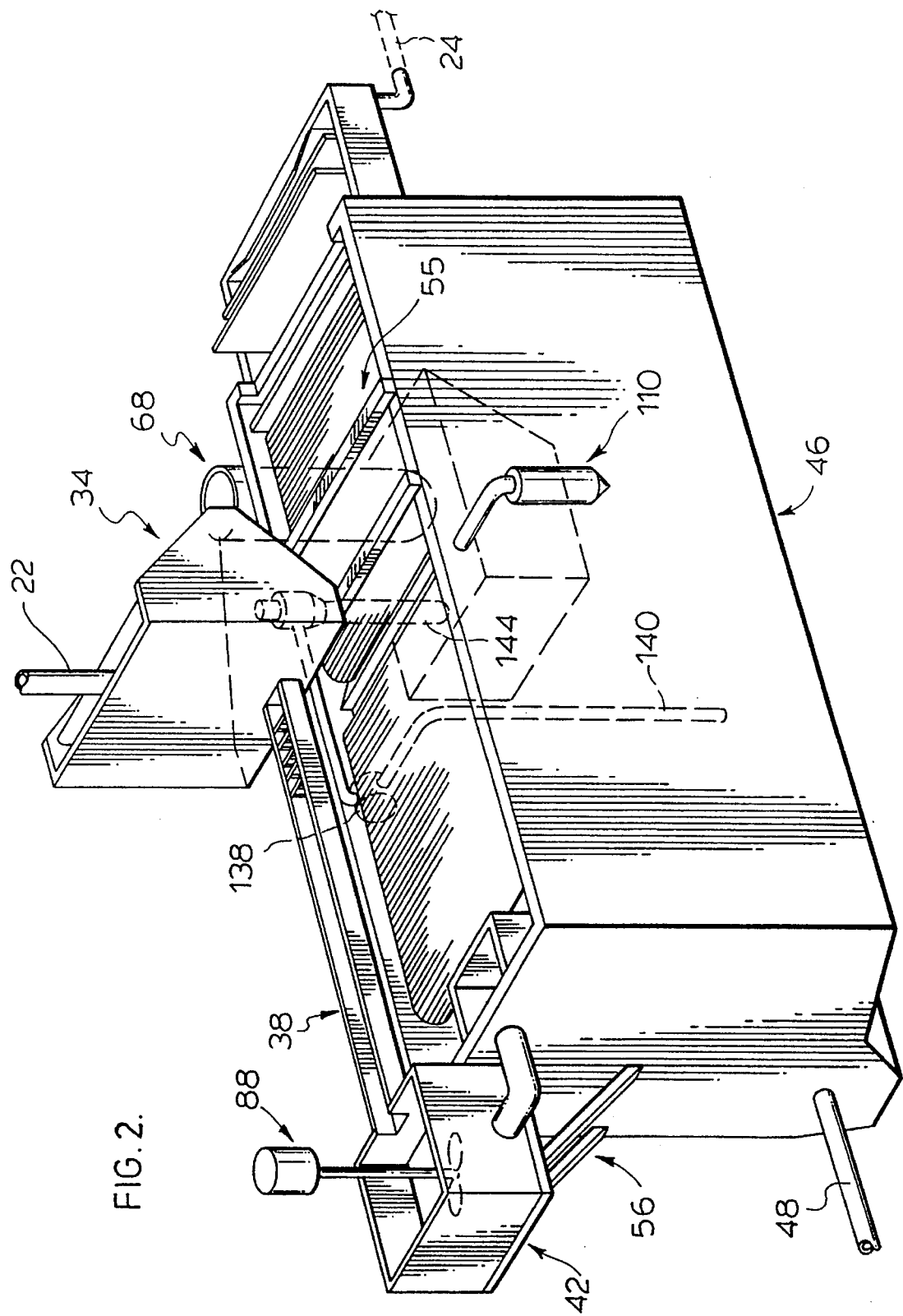
FIG. 2 is a perspective view of a unitary pre-treatment apparatus of the form provided by the invention.

Referring first to FIG. 2, a unitary headworks (pretreatment) apparatus provided by the invention is generally denoted by reference numeral 20. An inlet for raw wastewater is indicated at 22 and a treated effluent outlet is represented by a pipe 24 which leads to downstream treatment units indicated respectively at 26, 28 and 30 in FIG. 3. In a typical sewage tertiary treatment plant, unit 26 may be a biological treatment installation, unit 28 an effluent filter and unit 30 a sludge digestion and de-watering unit. Since units of this type are conventionally used in sewage treatment plants, they will be familiar to a person skilled in the art. For this reason, and since the particular forms of these units are irrelevant to the invention, the units will not be described in detail. A treated "clean" water outlet from the overall treatment plant is indicated at 32.

Figure 3:
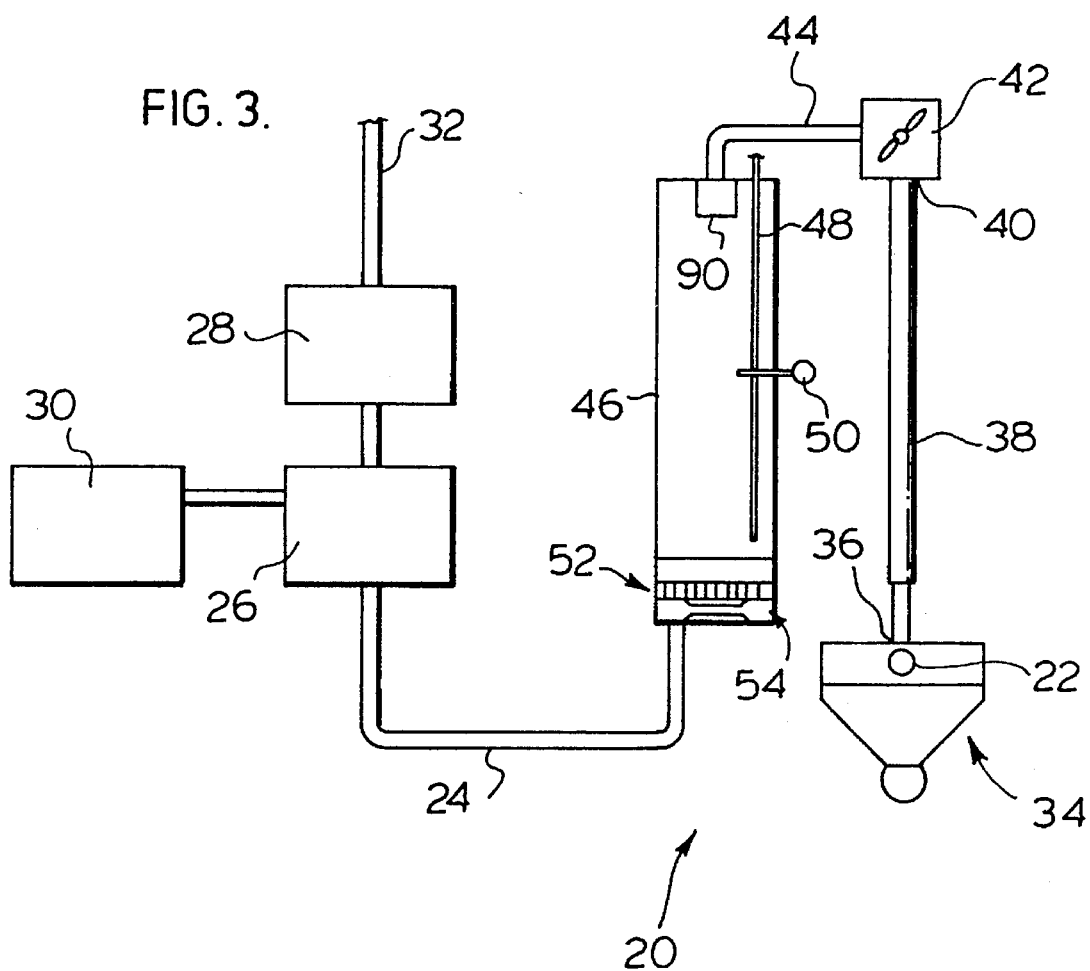
FIG. 3 is a schematic plan view of the apparatus of FIG. 2, with the individual components of the apparatus shown in "exploded" positions.

In FIG. 3, the components of the headworks are shown in exploded positions for clarity of illustration; FIG. 2 on the other hand shows a practical example of a unitary headworks plant incorporating those components. Referring primarily to FIG. 3, reference numeral 34 denotes a fine screen which receives raw wastewater from the raw wastewater inlet 22 and which is designed to remove coarse particles from the wastewater. An outlet from filter 34 is indicated at 36 and communicates with a flume 38 having an inlet which is coupled to outlet 36, and a discharge 40. The flume incorporates a de-ragger which is not specifically illustrated in FIG. 2 but which will be shown and described in detail later.

In the preferred embodiment illustrated, flume 38 discharges into a chemical mixing tank 42 which has an outlet pipe 44 communicating with a scum and grit removal tank 46. As will be described in more detail later, tank 46 is provided with scum skimmers, air diffusers for pre-aeration of the wastewater, grit removal means, secondary de-ragging means and a parshall flume for flow measurement purposes. These components are generally indicated in FIG. 3 and are shown in more detail in later views. In FIG. 3, an air diffuser pipe is indicated at 48, a grit collection sock at 50, a secondary de-ragger at 52 and a parshall flow measuring flume at 54. Also to be described in more detail later but not specifically shown in FIG. 3 is a skimmer for removing scum from the surface of a body of water in tank 46.

In the embodiment illustrated, the chemical mixing tank 42 is shown located upstream of the scum removal tank 46. However, the chemical mixing tank could be located downstream of the scum removal tank if required.

Referring now more particularly to FIG. 2, it will be seen that the components referred to previously are assembled into a unitary pretreatment plant. Specifically, the fine screen 34 is supported by a grating 55 that is mounted on the top edges of the walls of the scum and grit removal tank 46. Similarly, the chemical mixing tank 42 is supported by brackets 56 from an end wall of tank 46. It should be noted that, in FIG. 6, the tank walls are shown as being of reduced height, for convenience of illustration.

Figure 1:
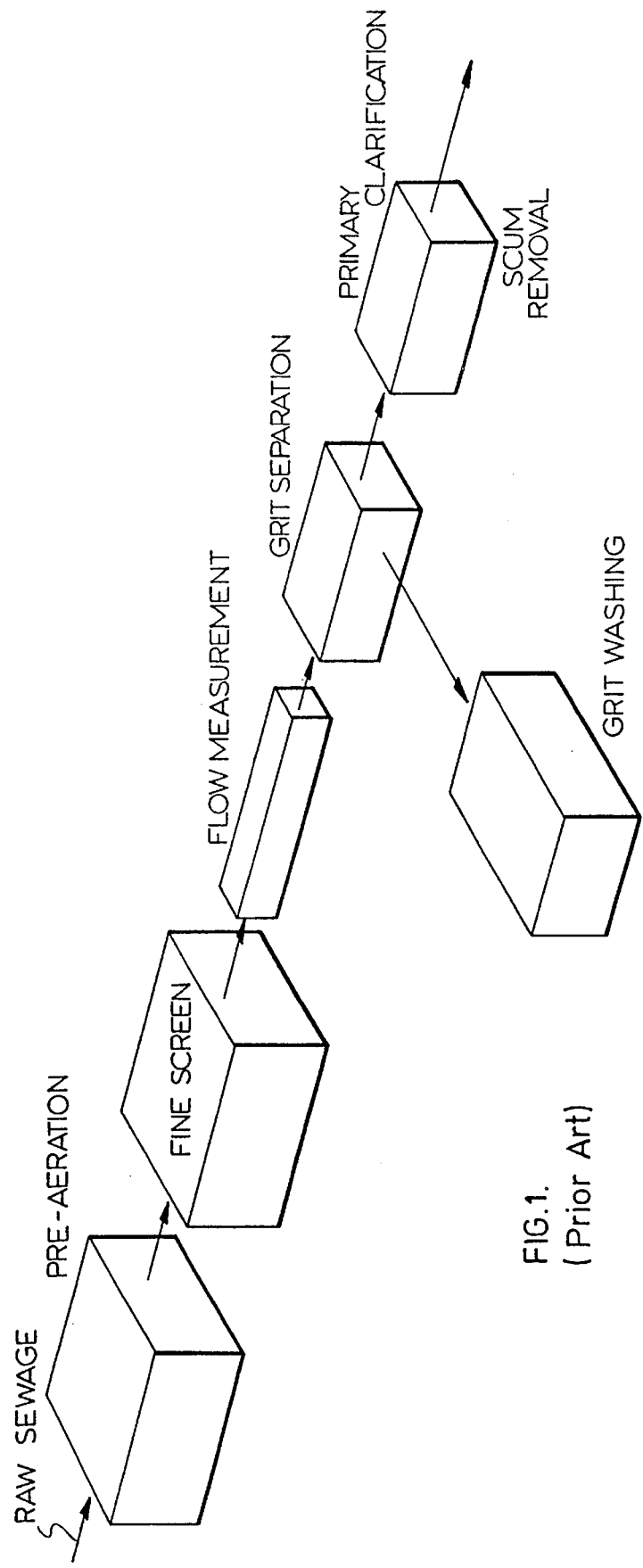
FIG. 1 is a schematic illustration of a conventional multiple unit wastewater pre-treatment plant.

By comparing FIG. 2 with the schematic illustration of a conventional wastewater pretreatment plant as shown in FIG. 1, it will be apparent that the invention provides a compact, unitary assembly that offers numerous advantages as compared with the prior art. In the prior art, multiple individual treatment units must be provided and, typically, perform the functions indicated in FIG. 1. These units are often installed in widely spaced locations, sometimes several hundred feet apart. As indicated previously, this approach is costly both in terms of initial planned design, construction costs, land use cost and in terms of on-going operating costs. The headworks of the form provided by the invention, on the other hand, can be assembled in a relatively small space. The individual components can be factory prefabricated and shipped to the job site as a "kit". Typically, the tank 46 would be poured on site in concrete and the remaining components would then be assembled onto the tank. Overall, this technique should account for significant capital cost savings.

Further, the particular headworks apparatus provided by this embodiment of the invention provides for nine separate treatment functions that are integrated into the unitary assembly shown in FIG. 2. These functions will be described in more detail later.

Figure 4:
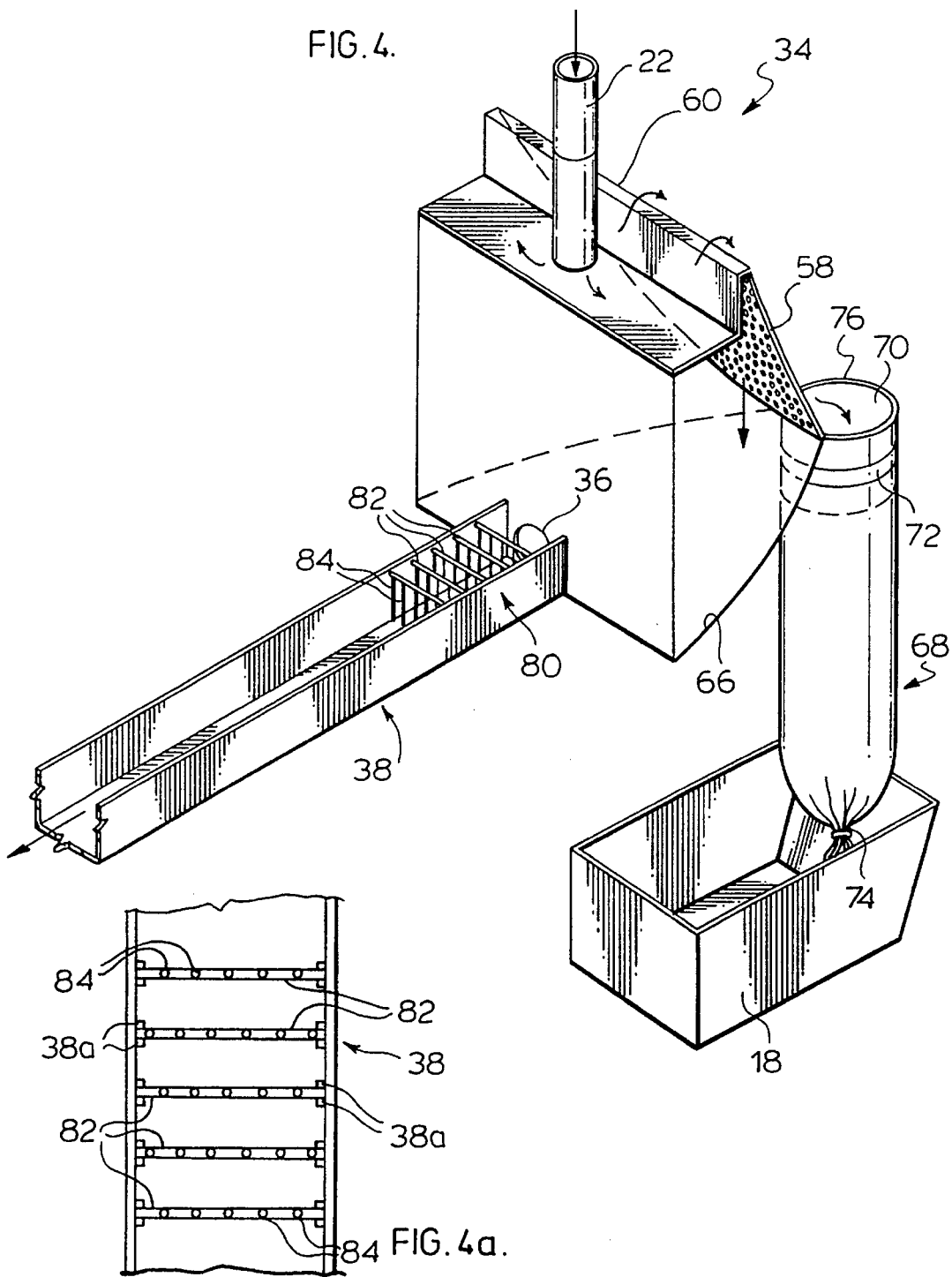
FIG. 4 is a perspective view from one side and above of a screen forming part of the apparatus of FIGS. 2 and 3.
Figure 5:
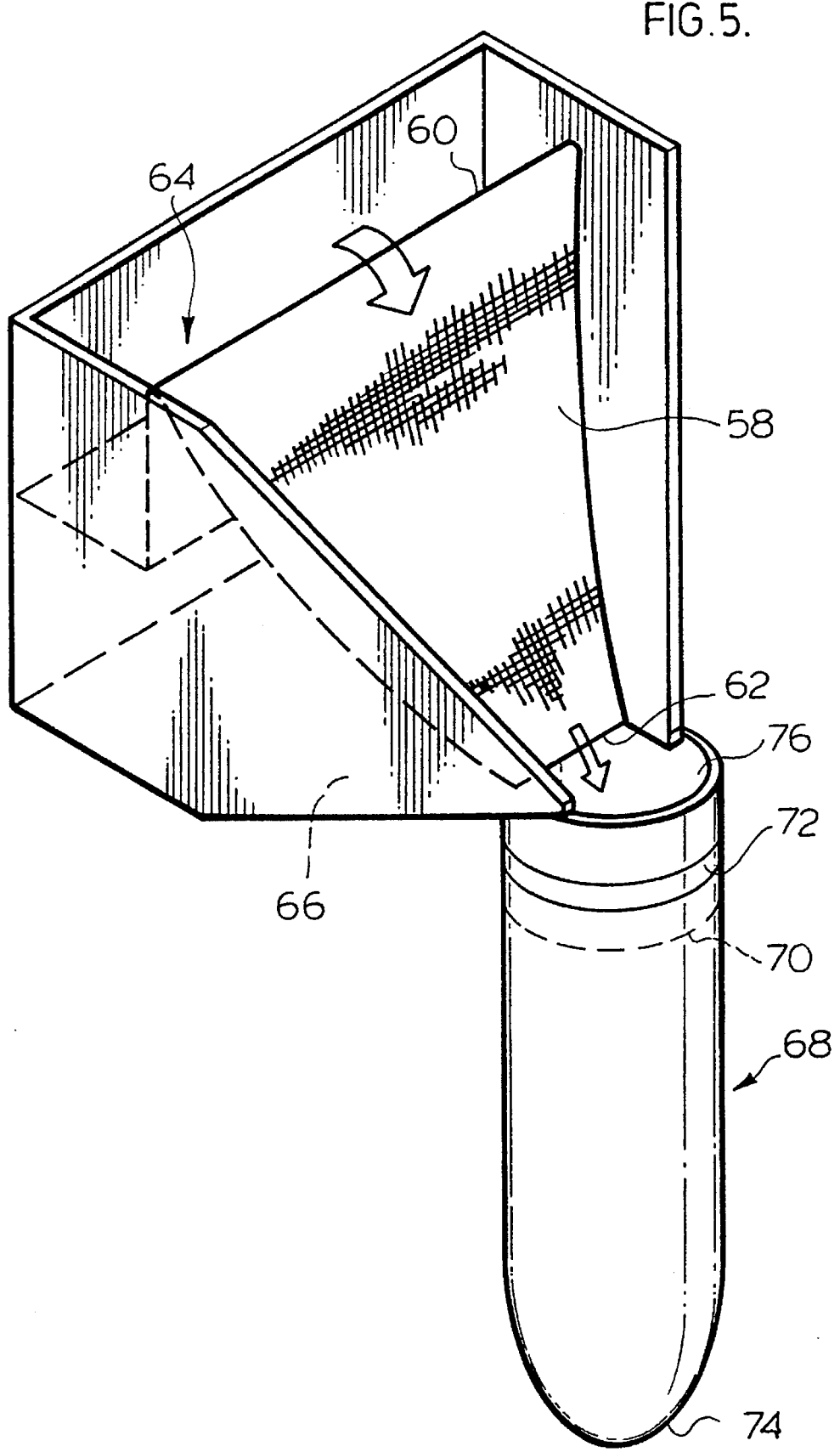
FIG. 5 is a perspective view from the opposite side and to the right in FIG. 4.

Referring now to FIGS. 4 and 5, the fine screen 34 is shown in some detail and in FIG. 4 part of flume 38 is shown associated with the fine screen.

As perhaps best shown in FIG. 5, fine screen 34 is essentially an inclined parabolic screen which includes a screen 58 of a shape that tapers from an elevated "input" end 60 to a lower discharge end 62. The input end 60 of the screen in effect forms a weir at one side of a tank 64 which receives raw wastewater from inlet 22 (FIG. 4). Thus, as the tank 64 fills, the raw wastewater will spill over the weir and flow down the inclined screen 58. The screen has a mesh size selected to allow water to pass through the screen while coarse particles are held back and flow down the screen towards the discharge end 62. Water that passes through the screen flows down an inclined surface 66 to an outlet 36 (FIG. 4).

In a conventional inclined screen, the debris that is held back on screen 58 would simply be allowed to accumulate as sludge. However, in accordance with the present invention, the debris is directed into a novel debris collection device generally indicated by reference numeral 68. In this embodiment, device 68 is a fabric sock which is suspended from a tubular support or collar 70 mounted at the discharge end 62 of the inclined screen 58. A band or clamp which holds the sock on support 70 is indicated at 72. It will be seen that the sock is suspended in a generally upright orientation and has a closed lower end 74 and an open upper end 76 into which wet debris falls from screen 58. In this embodiment, the sock can be but is not limited to woven fabric and may be made, for example, from DACRON™ or other appropriate material. The weave is selected to provide the sock with a porosity which allows water to pass therethrough while retaining grit and other debris within the sock. A tank 78 is provided below the sock to collect water that may drain from the sock (see FIG. 4).

As was discussed previously, this form of debris collection device has significant advantages over the prior art. The debris that is flushed from screen 58 is collected and retained within the sock in a form in which it can conveniently be handled for disposal. For example, when the sock is full of debris and becomes odoriferous, the clamp 72 can be removed and the sock taken off the support 70. The sock can then be emptied, or the entire sock and its contents can be disposed of together. A replacement sock can quickly be placed on collar 70 with minimum screen "down time".

While the sock is suspended from collar 70, liquid can continuously drain from the debris within the sock and the debris can at least partially dry, minimizing odor problems.

It should be understood at this stage that the particular application of the debris collection device 68 shown in FIGS. 4 and 5 is an example only and that the device may be used in other situations in wastewater treatment plants. Another example is shown in FIG. 6 (to be described).

It should also be understood that the particular form of debris collection device may vary. For example, as noted previously, a rigid receptacle may be used. The receptacle may take the form of a wire cage. Conversely, a wire cage may be provided inside a sock of the form shown in the drawings (flexible or rigid) in order to trap large solid particles before they enter the sock proper. In one embodiment, the receptacle may comprise a coarse wire mesh sock surrounded by an enclosure of finer wire mesh or fabric.

Referring specifically to FIG. 4, it will be seen that flume 38 comprises a channel or trough that slopes downwardly from the screen outlet 36 to a discharge end 40 of the flume at the chemical mixing tank 42 (FIG. 3).

As mentioned previously, the flume 38 is provided with de-ragging means, which are generally indicated at 80 in FIG. 4. The de-ragging means comprises a series of cross members 82 which extend transversely of the flume, generally between the tops of its sidewalls. Suspended from each cross member are a series of fine bars 84 which extend over substantially the entire height of the flume and are free at their lower ends. In other words, the bars 84 simply hang from the cross members 82. As such, the bars represent obstructions to water flowing down the flume and rags, condoms, plastic pieces and other like debris tend to be trapped by the bars. In another embodiment, the bars could be supported at the bottom, e.g. by a plate that lies transversely on the bottom wall of the flume, or the bars could extend horizontally across the flume from a support at the side.

As best seen in FIG. 4a, the bars on adjacent cross members are offset laterally with respect to one another so that the bars on a downstream cross member tend to catch debris that might flow between the bars that are immediately upstream.

The sidewalls of the flume are provided with seats 38a or retainers for the ends of the cross members 82 so that the cross members (together with the bars 84 that are suspended from them) can simply be lifted out of the flume and any trapped rags or other debris manually removed.

It should of course be understood that de-ragging means 80 can be located at any convenient point along the length of the flume and may comprise any number of de-ragging assemblies each comprising a cross member 82 and the bars 84 suspended therefrom.

Referring now to FIG. 6, it will be seen that the discharge end 40 of the flume 38 is located in a recess in a sidewall of the chemical mixing tank 42. Tank 42 is simply a plain receptacle to which the flume 38 represents an inlet and pipe 44 an outlet. A body of water within the tank is indicated at 86 and will normally extend to a level above the inlet of pipe 44, depending on the flow rate of wastewater into the mixing tank. A mechanical mixer 88 is provided in tank 42 for mixing of chemicals into the wastewater. Alternatively, the tank 42 and the mechanical mixer 88 can be replaced by an inline static mixer. Means for delivering chemicals into tank 42 have not been shown but may comprise any appropriate form of chemical dispenser—or the chemicals may be manually introduced into tank 42.

As noted previously, chemical addition is preferably performed upstream of the scum removal tank 46. Typically, the chemicals are selected to cause agglomeration of particles within the wastewater or to remove phosphorous. Sludge that may arise from this chemical addition will often appear as a scum on the water or will settle with the grit. By adding the chemicals upstream of tank 46, any such scum or settled particles can be removed in tank 46, i.e. soon after it has been formed. This contrasts with conventional practice where chemicals are added in an aeration basin at a subsequent stage in the treatment process. In this case, the chemicals often have an adverse effect on the biological solids within the wastewater.

Scum removal tank 46 receives wastewater from the flume 38 via the chemical mixing tank 42, through pipe 44. In this embodiment, the tank has an inlet box 90 into which pipe 44 discharges and the box has a discharge pipe 92 that delivers incoming water to a relatively low level in tank 46. Normally, box 90 will be at least partially full and pipe 92 will be sized to provide an appropriate rate of flow of water into tank 46. An effluent outlet from the tank is indicated at 94 and communicates with the treated effluent outlet pipe 24 shown in FIG. 3.

Tank 46 is designed to contain a body of water to a defined level denoted L (liquid level) in FIG. 6. A skimmer for removing scum from the surface of the body of water is indicated at 96. Skimmers are in fact provided at both ends of the tank, though only one skimmer has been shown. The skimmer essentially comprises an endless belt 98 which extends around rollers 100 and 102 disposed transversely with respect to the length of the tank. Belt 98 has a series of transverse flights 104 which are designed to move across the surface of the body of water in tank 46 (to level L) to move any scum on that surface into a scum collector 106 disposed generally at the center of the tank via a ramp 106a. Suitable drive arrangements (not shown) are provided for rotating the belt 98 at a relatively slow speed so that the lower run of the belt moves towards the scum ramp 106a and collector 106. The other skimmer (not shown) moves in the opposite direction and also delivers scum into collector 106, via a second ramp 106a.

Collector 106 is mounted at a slight downward inclination to the right as shown in FIG. 6 so that collected scum will tend to move in that direction. A pipe 108 at the right hand end of the collector delivers the scum liquid into a scum concentrator 110 comprising a cone bottom tank in which the scum can accumulate at an upper level while liquid can be withdrawn from below the scum through an outlet 110a at the bottom of the tank. The liquid will be returned to inlet box 90. The concentrated scum will be removed from the tank and disposed of separately and therefore will not be a problem to the main treatment process.

The wall 46a of tank 46 at the extreme right hand (discharge) end as seen in FIG. 6 is provided in its upper margin with a recess which defines a weir 112 over which treated wastewater flows from tank 46. A baffle 114 is provided between weir 112 and the scum skimmer 96 to prevent scum from being drawn over the weir.

Immediately downstream of weir 112 is a wastewater launder 120 into which the de-scummed and de-gritted wastewater will flow. This liquid will then flow through opening 118 into a second de-ragging flume 52 and then into parshall flume 54 (both mentioned previously in connection with FIG. 3), leaving via outlet 94. The secondary de-ragger has not been shown in detail but essentially is the same as the de-ragger means 80 described in connection with FIG. 4. Again, the number of individual de-ragger assemblies may vary, as may the spacing between the assemblies and the gaps between the individual bars 84.

In addition to the features already described, scum removal tank 46 is provided with an air diffuser pipe 124 for pre-aeration of the wastewater within tank 46, and grit removal means generally indicated at 126.

It will be seen that the bottom wall of the tank is contoured to provide a longitudinally extending trough or sump 128 which is offset towards one of the longitudinal sidewalls of the tank (the rear sidewall as seen in FIG. 6). FIG. 6a shows the profile of the bottom wall of the tank in some detail and illustrates this offset. Air diffuser pipe 124 extends generally longitudinally of the sump 128 but again offset somewhat towards the rear wall of the tank. Pipe 124 has diffuser outlets 130 that are directed upwardly in the tank so as to induce in the wastewater a circular "rolling" action as generally represented by the arrow denoted 132 in FIG. 6a.

To the right of sump 128 as seen in FIG. 6a, a portion 134 of the bottom wall of the tank slopes towards the sump. The location and direction of the air diffusers 130 are selected so that the rolling action imparted to the wastewater tends to cause the water to flow downwardly towards surface portion 134 again as shown in FIG. 6a. It has been found that this rolling action tends to cause any grit that remains within the wastewater to settle out onto surface 134 and flow into sump 128.

It can be seen from FIGS. 6 and 6a that the bottom wall of sump 128 is also contoured to slope inwardly from opposite ends of the sump towards a low point in the center, indicated at 136 in FIG. 6. The grit collection means 126 includes a pump 138 the suction side of which is connected to a pipe 140 having an inlet that is positioned at this low point 136 in the bottom wall of the trough. Accordingly, grit that tends to accumulate at this low point can be sucked out of the trough by pump 138. The pump discharges upwardly into a highly efficient cyclone separator 142 which has a discharge 142a at its lower end fitted with a sock 144. Again, the sock is essentially of the same form as the sock 68 described previously in connection with FIGS. 4 and 5. Accordingly, grit that is separated out by the cyclone can be collected in similar fashion to the screening that is removed by the primary fine screen of FIGS. 4 and 5. The cyclone 142 may be a conventional unit of the type that is available from Derrick Equipment Company of Houston, Texas under the trade mark HYDROCYCLONE.

To summarize, the headworks provided by the invention, in its preferred embodiment, is essentially a unitary treatment apparatus that provides nine treatment functions that would normally be performed by individual and separate treatment units in a conventional sewage treatment plant. The first is the initial screening provided by fine screen 34 for removing relatively coarse debris. This is followed by de-ragging in flume 38 and then by chemical addition in the chemical mixing tank 42. In tank 46 there is an opportunity for grit and scum removal and a secondary de-ragger. Scum is also removed and the wastewater is subjected to pre-aeration from air line 124. Finally, flow measurement is accomplished in flume 54.

The debris collection device provided by the invention, a specific embodiment of which is shown in detail in FIGS. 4 and 5 is also believed to represent a significant advance in the art. For example, in the field of aerated grit separators, conventional practice is to design the unit on the basis of separating out the grit only and leaving organic material in suspension to be removed at the next treatment stage. The removed grit is washed to ensure that it contains little or not organic matter. This is done to eliminate the possibility of odors that may develop in the collected grit. With the debris collection device of the invention, a completely enclosed container for the grit is provided and the danger of odors is removed. There is no longer a need for grit washing and an aerated grit separator can be designed to remove settled organic particles as well as grit. For example, the grit and scum removal tank 46 is in essence a combination grit separator and primary clarifier. This greatly reduces the organic load on downstream stages of the treatment process.

It will of course be appreciated that the preceding description relates to a particular preferred embodiment of the invention and that many modifications are possible within the broad scope of the invention. Some of those modifications have been described and others will be apparent to a person skilled in the art.

I claim:

1. A unitary wastewater treatment apparatus having an inlet for raw wastewater and a treated effluent outlet, the apparatus comprising:

a screen filter for receiving raw wastewater from said raw wastewater inlet and removing coarse particles from the wastewater, said screen filter having an outlet;

a flume having an inlet coupled to said outlet, and a discharge;

de-ragging means in said flume;

scum and grit removal means comprising a tank for receiving wastewater from said flume and for containing a body of water to a defined level, said tank having an effluent outlet communicating with said treated effluent outlet of the apparatus, a skimmer for removing scum from the surface of said body of water, pre-aeration means for aerating water in the tank, and grit removal means; and, chemical mixing means between said flume discharge and said treated effluent outlet of the apparatus.

2. An apparatus as claimed in claim 1, wherein said pre-aeration means comprises an air inlet pipe extending into a lower region of said tank and provided with diffusers for aerating water in said tank.

3. An apparatus as claimed in claim 2, wherein said diffusers are directed upwardly and oriented to induce a rolling action in the water as an aid to settling of grit from the water, the apparatus further comprising means for removing the settled grit.

4. An apparatus as claimed in claim 3, wherein said tank has a bottom wall provided with a sump which is generally co-extensive with said aeration pipe and which is contoured to direct settled grit towards a grit collection point in the sump at which said grit removal means is located.

5. An apparatus as claimed in claim 4, wherein said grit removal means comprises a pump having a suction side which communicates with a pipe having an inlet at said grit collection point, and a discharge side communicating with means for separating the grit from wastewater removed by said pump.

6. An apparatus as claimed in claim 5, wherein said separating means has a grit discharge provided with a debris collection device suspended from said discharge in a generally upright orientation, said receptacle having a closed lower end and a open upper end into which wet grit is delivered from said discharge, the receptacle having a porosity selected to allow water to pass therethrough while retaining the grit within the receptacle and the receptacle being flexible and removable from said discharge for disposal of collected grit.

7. An apparatus as claimed in claim 1, wherein said scum skimmer comprises a scum collection trough and at least one endless belt having flights arranged to skim scum from the surface of said body of water and deliver the scum into said scum collection trough, said trough being oriented to direct collected scum and wastewater through a discharge fitted with a scum concentrator.

8. An apparatus as claimed in claim 1, wherein said scum and grit removal tank has a discharge end provided with a weir over which water flows into a collector tray provided with secondary de-ragging means and a parshall flume for flow measurement, the tray being provided with flow directing means for causing the wastewater to flow sequentially through said de-ragging means and said partial flume.

9. An apparatus as claimed in claim 1, wherein said screen filter includes an inclined screen having an inlet end and a discharge end and including means for receiving said raw wastewater from said inlet and providing a weir at the inlet end of said screen, the filter further including means for collecting water that passes through said screen and delivering the water to said outlet, and a debris collection device at said discharge end of the screen, the device comprising a tubular receptacle suspended in a generally upright orientation from a support at said discharge end of the screen filter, said receptacle having an open upper end into which wet debris is delivered from said screen, the receptacle having a porosity selected to allow water to pass therethrough while retaining the debris within the receptacle, and the receptacle being flexible and removable from said support for disposal of debris contained therein.

10. An apparatus as claimed in claim 1, wherein said de-ragger comprises a series of de-ragger assemblies located in spaced positions along said flume and each comprising a cross member removably coupled to sidewalls of the flume, and a series of bars that extend generally vertically downwardly from the cross members for obstructing movement of rags and like debris along the flume.

11. An apparatus as claimed in claim 10, wherein the bars of successive de-ragger assemblies in the direction of flow along said flume are staggered laterally with respect to one another.

12. An apparatus as claimed in claim 1, wherein said chemical mixing tank is located between said flume discharge and said scum removal tank.

13. An apparatus as claimed in claim 12, wherein said chemical mixing tank is provided with a mechanical mixer for mixing chemicals into the wastewater.

14. An apparatus as claimed in claim 12, wherein said chemical mixing tank is provided with an outlet pipe for delivering wastewater to said scum removal tank, and wherein the scum removal tank is provided with an inlet box into which said pipe discharges, said box being provided in a bottom wall with a discharge pipe that extends downwardly to a location adjacent a bottom wall of the scum removal tank.

* * * * *